3,032,401
PROCESS FOR DETERMINING AMOUNT AND UNIFORMITY OF DISTRIBUTION OF COLLOIDAL SILICA
Vernon Lee Turner, Jr., Brandywine Hundred, Del., assignor to E. I. du Pont de Nemours and Company, Wilmington, Del., a corporation of Delaware
No Drawing. Filed Dec. 28, 1960, Ser. No. 78,826
3 Claims. (Cl. 23—230)

This invention relates to processes for determining the amount and uniformity of distribution of colloidal silica deposited as a layer on surfaces, and is more particularly directed to such processes in which a solution of a lower-alkylamino-substituted triphenylmethane lactone is applied as a coating to the deposit and the coating is dried, whereby a color develops having an intensity in proportion to the amount of colloidal silica present in the deposit, and the amount of said silica is determined by comparing the color of said dried coating with a standard showing the intensity of color developed with the same lactone solution by known amounts of silica on the surface.

Colloidal silica has been applied to paper for such varied purposes as making the paper waterproof or fireproof as taught by Piper U.S. Patent 135,153, issued January 21, 1873, or German Patent 359,039, granted July 2, 1918, or for giving the paper a smooth, glassy surface as taught by Baum U.S. Patent 1,230,095, issued June 19, 1917. More recently, silica sols have been applied to paper to improve its wet strength, as taught by Britt U.S. Patent 2,399,981, issued May 7, 1946, or to increase the coefficient of friction of containers made therefrom, as taught by Wilson U.S. Patent 2,643,048, issued June 23, 1953. The alkali-stabilized silica sols containing discrete particles, especially in the size range of about 5 to 20 millimicrons, as described in Bechtold and Snyder U.S. Patent 2,574,902, issued November 13, 1951, are well adapted for making the articles of the said Wilson patent.

Whatever the objective in applying the silica sol to paper, it is valuable to know how much colloidal silica has been applied and how uniform a coverage has been achieved. Ordinary methods of chemical analysis are not well adapted to such determinations. The total amount of silica in the paper can be ascertained in this way, but to determine the proportion of such silica which is disposed on the surface of the paper or its uniformity of distribution is a laborious procedure.

Now according to the present invention it has been found that when a solution of a lower-alkylamino-substituted triphenylmethane lactone is applied as a coating to a surface which has previously been treated with colloidal silica a characteristic color develops to the extent that colloidal silica is present on the surface. By comparing the depth of the color with a standard showing the depth of color with known amounts of silica the amount of silica on the paper can be ascertained. Similarly, the uniformity of the color indicates the uniformity of silica distribution. Accordingly, by a process of the present invention a rapid, easy, and inexpensive method is provided for measuring, on at least a semi-quantitative basis, the amount and extent of colloidal silica coverage on paper.

The lactones which are used in the coating solution applied to the treated paper are hereinafter sometimes referred to as "color compounds" for the sake of convenience. They are not dyes as that term is ordinarily defined because they do not color the paper if no silica is present. Rather, they are chemical indicators.

As the color compound, lower-alkylamino-substituted triphenylmethane lactones as a class can be used. Especially effective and hence preferred are the 3,3-bis(p-lower-alkylaminophenyl)phthalides having the formula:

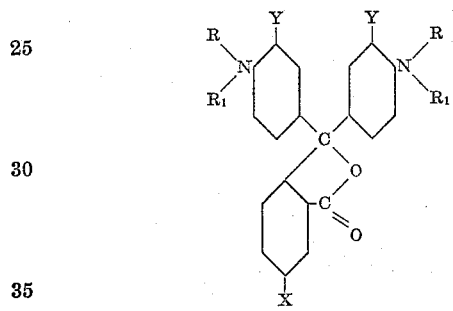

where

R is H or alkyl of 1 to 4 carbon atoms
$R_1$ is alkyl of 1 to 4 carbon atoms
X is H or

$R_2$ and $R_3$ being alkyl of 1 to 4 carbon atoms
Y is H or $CH_3$

Included in this preferred class of phthalides which is especially effective are the following color compounds:

| Compound | R | $R_1$ | X | Y |
|---|---|---|---|---|
| 3,3-bis(4-dimethylaminophenyl)-6-dimethylaminophthalide | —$CH_3$ | —$CH_3$ | —$N(CH_3)_2$ | H |
| 3,3-bis(p-methylaminophenyl)-phthalide | H | —$CH_3$ | H | H |
| 3,3-bis(p-ethylaminophenyl)-phthalide | H | —$C_2H_5$ | H | H |
| 3-3-bis(p-dimethylaminophenyl)-phthalide | —$CH_3$ | —$CH_3$ | H | H |
| 3,3-bis(p-diethylaminophenyl)-phthalide | —$C_2H_5$ | —$C_2H_5$ | H | H |
| 3,3-bis(p-di-n-propylaminophenyl)-phthalide | —$C_3H_7$ | —$C_3H_7$ | H | H |
| 3,3-bis(4-dimethylamino-3-methylphenyl)phthalide | —$CH_3$ | —$CH_3$ | H | $CH_3$ |
| 3,3-bis(p-diethylaminophenyl)-6-dimethylamino phthalide | —$C_2H_5$ | —$C_2H_5$ | —$N(CH_3)_2$ | H |
| 3,3-bis(p-diethylaminophenyl)-6-diethylamino phthalide | —$C_2H_5$ | —$C_2H_5$ | —$N(C_2H_5)_2$ | H |
| 3,3-bis(p-di-n-propylaminophenyl)-6-di-n-propylamino phthalide | —$C_3H_7$ | —$C_3H_7$ | —$N(C_3H_7)_2$ | H |
| 3,3-bis(p-di-n-butylaminophenyl)-6-di-n-butylamino phthalide | —$C_4H_9$ | —$C_4H_9$ | —$N(C_4H_9)$ | H |

In the processes of this invention the color compound develops a characteristic color in contact with colloidal silica on paper. It will be understood that the color will vary from one color compound to another but is usually some shade of blue, green, violet, or indigo. Moreover, the color as observed will be affected by the color of the paper under test. For instance, the characteristic tan color of kraft paper will cause the color compound to form a different color with silica than that which is produced with the same color compound and colloidal silica on pure white paper. These differences, however, are unimportant since they are only relative and are compensated for in the preparation of the color standard.

For application to the silica-coated paper the color compound is dissolved in a suitable solvent. The desired color development does not occur in water, so it is necessary to use a solution in an organic solvent. The solvent must not be reactive with the color compound and should have a boiling point which permits the coating to dry in a reasonable length of time. Thus, the boiling point of the solvent is preferably below about 130° C. Specific solvents which can be employed advantageously include aromatic hydrocarbons such as benzene, toluene, or xylene, halogenated hydrocarbons such as carbon tetrachloride, chloroform, or ethylene dichloride, and ketones such as acetone.

The concentration of the color compound in the solvent is not particularly important as long as enough is present in a reasonable volume to react with all of the silica, and is selected with particular reference to the dye used and the probable concentration of silica on the paper to be tested. About from 1 to 2% of color compound solids in the organic solution is a suitable range of concentration for a color compound such as 3,3-bis(p-diethylaminophenyl)-6-dimethylamino phthalide when used for measuring the amounts of colloidal silica customarily applied to kraft paper for improving the coefficient of friction of containers made therefrom. Such paper ordinarily contains from 0.05 to 0.2 pound of $SiO_2$ per thousand square feet of paper, these amounts being in the optimum range for increasing the coefficient of friction.

In the presence of the colloidal silica on the paper the color compound develops a characteristic color as above indicated. While an estimate of the amount of silica present can be made by examination of the wet coating, greater accuracy can be achieved by drying the coating before comparing with the color standard. Accordingly, in a preferred practice of the invention a solution of the color compound is dried in contact with the paper.

The dried color coating is compared with a known standard to give a measure of the amount of silica on the paper. Such a standard is prepared by applying a measured amount of silica sol containing a known amount of silica, drying, applying color solution, and again drying. A chart showing the depth of color for different concentrations of silica can be made. Subsequently, the amount of color in an unknown sample of the paper can be determined by comparison with this chart.

It will be apparent that the paper used in making the color standard should correspond to the paper which is subsequently to be treated with the silica sol on a commercial basis. While there will not be much variation between various kraft papers the presence of extraneous materials such as acid clay in the paper should be avoided.

The uniformity of distribution of the silica on the paper will be evident from the uniformity of the color developed with the color compound. If distribution is substantially uniform, as is usually desired, the depth of color will also be substantially uniform. On the other hand, uneven development of color in the test sample indicates a lack of uniform application of the silica sol, and adjustments to give a better, more even distribution can be made.

The invention will be better understood by reference to the following illustrative examples. The following stock solutions were first prepared:

*Indicator solution A.*—One part by weight of 3,3-bis-(p-diethlylaminophenyl)-6-dimethylaminophthalide

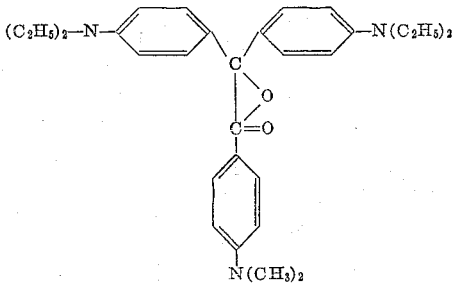

was dissolved in 200 parts by weight of chloroform.

*Indicator solution B.*—One part by weight of 3,3-bis-(p-diethylaminophenyl) - 6 - dimethylaminophthalide was dissolved in 200 parts by weight of carbon tetrachloride.

*Indicator solution C.*—The same as solution B except that 3,3-bis(p-diethylaminophenylphthalide

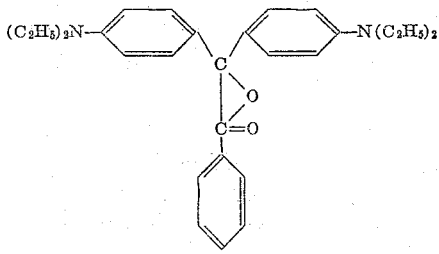

was used in place of 3,3-bis(p-diethylaminophenyl)-6-dimethyl aminophthalide.

*Silica test solution D.*—Two parts by weight of a 30% by weight colloidal dispersion of 15 millimicron silica was diluted with 98 parts by weight of distilled water.

*Example 1.*—Separate pieces of white bond paper were sprayed with amounts of silica test solution D sufficient to form coatings of 0.05, 0.1 and 0.2 pound of silica as $SiO_2$ per 1000 square feet of area, one side. The coatings were dried, and to the dried deposits there was in each case applied, by brushing, a sufficient amount of indicator solution A to wet the surface thoroughly. The chloroform solvent in the indicator solution was permitted to evaporate, whereupon a blue coloring developed on the paper samples. The intensity of the color was greatest on the sample which had been treated with 0.2 lb. silica/1000 sq. ft., least with the sample treated with 0.05 lb. silica/1000 sq. ft. A control sample of the paper to which no silica had been applied developed no color when treated with the indicator solution.

A chart was made by arranging side-by-side 1" x 3" strips of the control and the samples on which color had been developed, in order of increasing color intensity. A sample of the same paper was then treated with an unmeasured amount of silica test solution D, dried, and the dried paper treated with indicator solution A and dried. A blue color developed on the paper. By comparing this color with the colors on the chart it was ascertained that the unknown sample contained on its surface between 0.1 and 0.2 pound of silica per 1000 square feet.

*Example 2.*—The technique of Example 1 was used except that kraft paper (60 lbs.) was used instead of white bond. On evaporation of the indicator solvent, blue marks of intensity which increased with increasing silica residues were observed. No mark was observed on kraft paper which had not been treated with silica.

*Example 3.*—The technique of Example 1 was used except that indicator solution B was used instead of indicator solution A. Blue marks of an intensity which increased with increasing amounts of silica residues were observed immediately upon application of the indicator solution, rather than after solvent evaporation as in Example 1. When indicator solution B was applied to paper which had not been treated with silica, no blue mark was observed.

*Example 4.*—The procedure of Example 3 was followed except that kraft paper was used instead of white bond. The results were the same as in Example 3.

*Example 5.*—The procedure of Example 3 was followed except that indicator solution C was used instead of indicator solution B. This time a green mark was observed instead of a blue mark. Again, when the indicator solution was applied to paper which had not been treated with silica, no mark was observed.

I claim:

1. In a process for determining the amount and uniformity of colloidal silica deposited as a layer upon a solid surface the steps comprising applying a solution of a lower-alkylamino-substituted triphenylmethane lactone as a coating to the deposit, and drying the coating, whereby a color develops having an intensity in proportion to the amount of colloidal silica present in the deposit, and determining the amount of said silica by comparing the color of said dried coating with a standard showing the intensity of color developed with the same lactone solution by known amounts of silica on said surface.

2. In a process for determining the amount and uniformity of distribution of colloidal silica on paper the steps comprising applying a solution of a lower-alkylamino-substituted triphenylmethane lactone as a coating to the paper, and drying the coating, whereby a color develops having an intensity in proportion to the amount of colloidal silica present on the paper, and determining the amount of said silica by comparing the color of said dried coating with a standard showing the intensity of color developed with the same lactone solution by known amounts of silica on the paper.

3. A process of claim 2 wherein the lactone is a 3,3-bis(p-lower-alkylaminophenyl)phthalide having the formula

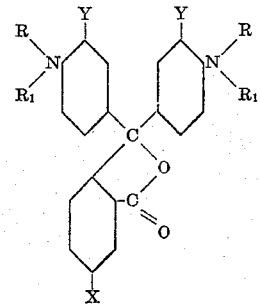

where R is selected from the group consisting of hydrogen and alkyl of 1 to 4 carbon atoms, $R_1$ is selected from the group consisting of alkyl of 1 to 4 carbon atoms, X is selected from the group consisting of hydrogen and

where $R_2$ and $R_3$ are alkyl of 1 to 4 carbon atoms, and Y is selected from the group consisting of hydrogen and $CH_3$.

No references cited.